United States Patent [19]

Coleman et al.

[11] Patent Number: 4,673,508

[45] Date of Patent: Jun. 16, 1987

[54] INHIBITION OF CALCIUM PHOSPHATE SCALE FORMATION WITH A MALEATE POLYMER

[75] Inventors: James P. Coleman, St. Louis; George Kvakovszky; David J. Sikora, both of Ballwin, all of Mo.

[73] Assignee: Monsanto Company, St. Louis, Mo.

[21] Appl. No.: 797,560

[22] Filed: Nov. 13, 1985

Related U.S. Application Data

[63] Continuation-in-part of Ser. No. 630,789, Jul. 13, 1984, abandoned.

[51] Int. Cl.$^4$ ................................................. C02F 5/12
[52] U.S. Cl. ..................................... 210/698; 252/180; 210/701
[58] Field of Search .............................. 210/698–701; 252/180, 181

[56] References Cited

U.S. PATENT DOCUMENTS

| 2,723,956 | 11/1955 | Johnson | 210/698 |
|---|---|---|---|
| 3,331,773 | 7/1967 | Gunderson et al. | 210/698 |
| 3,650,970 | 3/1972 | Pratt et al. | 210/698 |
| 3,715,307 | 2/1973 | Johnson et al. | 210/701 |
| 3,898,037 | 8/1975 | Lange et al. | 210/701 |
| 3,929,735 | 12/1975 | Barabas | 210/735 |
| 4,018,702 | 4/1977 | Boffardi et al. | 210/698 |
| 4,126,549 | 11/1978 | Jones et al. | 210/701 |
| 4,253,968 | 3/1981 | Eastman | 210/698 |
| 4,255,309 | 3/1981 | Klaessig et al. | 210/701 |
| 4,260,714 | 4/1981 | Wingard | 525/328.2 |
| 4,416,785 | 11/1983 | Menke et al. | 210/698 |
| 4,446,045 | 5/1984 | Snyder et al. | 210/698 |

*Primary Examiner*—Peter Hruskoci
*Attorney, Agent, or Firm*—Raymond C. Loyer

[57] ABSTRACT

Maleate polymers and derivatives of maleate polymers containing specified functional groups are effective scale inhibitors, for calcium phosphate scale.

17 Claims, No Drawings

INHIBITION OF CALCIUM PHOSPHATE SCALE FORMATION WITH A MALEATE POLYMER

This is a continuation-in-part of application Ser. No. 630,789 filed July 13, 1984, now abandoned.

FIELD OF THE INVENTION

This invention relates to a method for inhibiting the formation and deposition of calcium phosphate scale in aqueous media.

BACKGROUND OF THE INVENTION

The method of this invention has general applicability to any aqueous system where the formation and deposition of scale is a potential problem. It is particularly useful in inhibiting the formation and deposition of calcium orthophosphate scale. The most common systems in which scale formation can be a problem are in cooling water and boiling water systems. For the sake of simplicity, this invention will be discussed as it concerns cooling water systems.

A cooling water system is any system in which water is passed through a heat exchanger to provide cooling. A common system is a circulating system in which a cooling tower, spray pond, evaporative condenser, and the like serve to dissipate heat through evaporation of a portion of the cooling water. One result of this type of system is that the dissolved solids and suspended solids in the water become concentrated. The term employed in the art to indicate the degree of concentration of the circulating water as compared with the make-up water that is added to the system to replace water that has evaporated is "cycles of concentration". For example, two cycles of concentration indicates that the circulating water contains twice the concentration of dissolved and suspended solids as the make-up water.

Deposits in lines, heat exchange equipment, etc. may originate from several causes. Contaminant particles or substances may enter the system, where they may act as foulants which may agglomerate on surfaces. Corrosion of the system may occur resulting in deposition of the corrosion products on surfaces within the system. Additionally, deposits may form as a result of crystallization or precipitation of salts from the solution. These crystallized or precipitated salts are referred to as "scale" and the process is referred to as "scale formation".

Many factors affect the rate and quantity of scale formation. Some of these factors are as follows, temperature, rate of heat transfer, pH of the water, and the character and amount of dissolved solids in the water.

Although the discussion above is centered primarily on cooling water systems, the same considerations also apply to boiler water systems, and many other aqueous systems. Any aqueous system having calcium or magnesium cations or other positive hardness ions, and phosphate, carbonate, sulfate, or other suitable anions can experience formation and deposition of scale.

Circulating water systems have been operated under acidic conditions because of increased solubility of scale forming salts under acidic pH. Corrosion inhibition under these conditions in most instances involved solutions of chromate compounds. Chromate compounds have come under tight control as a result of limitations on pollutant discharge and other environmental concerns. As a result, the operating conditions for most cooling water systems had to be modified to accommodate new corrosion inhibitors. Cooling water systems are now most commonly run at relatively high pH. Many current corrosion inhibition systems involve the use of phosphates or phosphonates. The change to higher pH in cooling water systems has greatly increased the possibility of precipitation of scale forming salts. Additionally, the use of phosphates as corrosion inhibitors has greatly increased the possibility of formation of calcium phosphate scale, particularly calcium orthophosphate scale. Calcium orthophosphate is highly insoluble and inhibition of calcium orthophosphate scale has proven to be very difficult.

In addition to encrustation and heat transfer problems associated with scale formation, formation of calcium phosphate scale also removes phosphate from solution, reducing its effectiveness as a corrosion inhibitor. Inhibition of formation of calcium orthophosphate scale allows a higher concentration of phosphate in solution resulting in better corrosion inhibition. In this way, a calcium phosphate scale inhibitor can also be thought of as enhancing corrosion inhibition.

Even if phosphates are not added for corrosion inhibition, formation of calcium phosphate scale can be a problem. Phosphates can also be present in the water from a number of other sources. The supply water may contain phosphates from fertilizer runoff, sewage treatment, photochemical or oxidative degradation of phosphonates, natural sources, and other sources.

Calcium carbonate and calcium sulfate scale have also become larger problems as the pH of cooling water has been increased. Calcium carbonate and calcium sulfate are both soluble in an acidic solution, but are relatively insoluble at the higher pH's currently used in circulating water systems.

Of the polymers useful for scale inhibition, only a very small proportion are effective for inhibition of calcium orthophosphate scale. In view of the above, inhibition of scale formation, particularly inhibition of calcium phosphate scale, is becoming a larger, more difficult problem.

U.S. Pat. No. 4,029,577, to Godlewski et al. discloses a class of polymers that are said to be effective at inhibiting formation of calcium orthophosphate scale. These polymers are copolymers of either acrylic acid or derivatives of acrylic acid with hydroxy lower alkyl acrylates. U.S. Pat. No. 4,326,980, which issued Apr. 27, 1982 to Snyder et al., discloses a composition which is said to be effective for inhibiting calcium orthophosphate scale. This composition is a mixture of the copolymer of the Godlewski patent and a water soluble alkyl phenoxy polyethoxyethanol.

U.S. Pat. No. 4,432,884 to Kawasaki et al. discloses a class of polymers that are said to be effective at inhibiting formation of calcium phosphate scale. These polymers are copolymers of specified alkylolamides with specified alkenyl compounds. Both the alkylolamides and the alkenyl compounds are actually derivatives of acrylic acid.

U.S. Pat. No. 4,435,556 to Masler discloses a class of terpolymers that are said to be effective at inhibiting formation of calcium phosphate scale. The terpolymer consists essentially of the two monomers of Godlewski along with a lower alkyl polyalkoxylated acrylate or methacrylate.

Each of the polymers of these references is, broadly speaking, an acrylate polymer. The identification of scale inhibitors that are effective at high pH's that are currently used, and particularly those that are effective against calcium orthophosphate scale, would be an advancement in the art.

SUMMARY OF THE INVENTION

This invention relates to a method for inhibiting precipitation of scale forming calcium phosphates and more particularly calcium orthophosphate, in an aqueous system, which comprises adding to the aqueous system an effective amount of a water soluble maleate polymer that comprises the following repeating structural moiety:

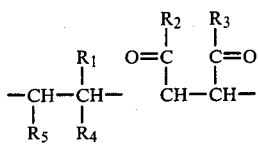

(a) in which at least one or both of $R_2$ and $R_3$ is a free acid or a water soluble salt of a free acid, or $R_2$, and $R_3$ together are oxygen to form an acid anhydride and (b) in which at least one of $R_1$, $R_2$, and $R_3$ contains a functional group selected from the class consisting of —OH, of alcohol;

of amine, amide, sulfonamide, amine oxide, quaternary ammonium salt or lactam; —SO of sulfonate, sulfone, sulfonamide, or sulfoxide; —O— of ether, or ester; or —S— of sulfide or mercaptan, except $R_1$ may be H where one of $R_2$ and $R_3$ is a free acid or water soluble salt of a free acid and the other of $R_2$ and $R_3$ contains said functional group and provided that $R_1$ is not a sulfonated phenyl group, and (c) in which $R_4$ and $R_5$ are either H or groups that do not render the polymer ineffective.

A particularly preferred subclass of polymers is water soluble copolymers with the following repeating structural moiety:

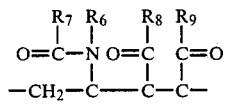

where $R_6$ and $R_7$ are the same or different and are alkyl groups, and $R_6$ and $R_7$ may join together to form a lactam ring, and where $R_8$ and $R_9$ are individually either H or a water soluble salt forming cation, such as sodium, potassium or ammonium, or $R_8$ and $R_9$ together are oxygen to form an acid anhydride. These polymers could, broadly speaking, be called copolymers of maleic anhydride and N-alkyl-N-vinylamides, with some of them being copolymers of maleic anhydride and N-vinyl-lactams.

Another preferred subclass of polymers is water soluble maleate polymer with the following repeating structural moiety:

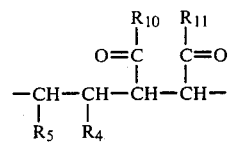

(a) where one of $R_{10}$ and $R_{11}$ is either a free acid or a water soluble salt of a free acid, such as sodium, potassium or ammonium, and the other of $R_{10}$ and $R_{11}$ is an ester of a polyol; a lower poly(alkylene oxide); a lower alkyl ether of a polyol or poly(alkylene oxide); or an alcohol amine, and (b) where $R_4$ and $R_5$ are individually either H or a group that does not render the polymer ineffective. Broadly speaking, this subclass of polymers can be thought of as half esters of maleic anhydride polymers.

These copolymers are effective at inhibiting the precipitation of scale forming salts, particularly salts of polyvalent metals, more particularly alkaline earth metal salts such as calcium salts, even more particularly calcium phosphate, and most particularly calcium orthophosphate. They are also effective as dispersants and antifoulants.

DESCRIPTION OF THE INVENTION

The polymers useful with the invention are maleate polymers and copolymers. This means that they are produced from maleic acid or, preferably, maleic anhydride or derivatives thereof. In order to achieve the desired functionality as described above, the polymer can either be prepared from monomers that already contain the desired functional groups, or a polymer can be made that can be derivatized to produce the desired functionality.

An example of polymers that can be prepared from monomers that contain the desired functional groups is the subclass of copolymers of maleic anhydride and N-alkyl-N-vinylamides described above. These copolymers are most conveniently produced by copolymerization of an N-alkyl-N-vinylamide, such as N-methyl-N-vinylacetamide or an N-vinyllactam, such as N-vinylpyrrolidone, with maleic anhydride. This produces directly the desired functionality, with $R_1$ being an amide group or a lactam group, and with $R_2$ and $R_3$ together being oxygen to form an acid anhydride. In order to improve solubility, a salt of the polymer is usually prepared, in which case a portion or all of $R_2$ and $R_3$ would individually be a water soluble salt of a free acid.

One skilled in the art will recognize many other comonomers that can be copolymerized with maleic anhydride in similar fashion to produce the desired functionality. These comonomers that contain a desired functional group include but are not limited to vinyl ethers, vinyl pyridine, vinyl lactams, vinyl esters, and derivatives of acrylate and methacrylate esters where a desired functional group is contained in the alcohol portion of the ester.

An example of polymers that are derivatized to contain the desired functional groups is the subclass of half esters of maleic anhydride described above. These polymers are most conveniently produced by polymerizing maleic anhydride with another comonomer, followed by reacting the polymer thus formed with an alcohol containing the desired functional group, to form the maleate half ester. Examples of suitable alcohols would be polyols, lower alkyl poly(alkylene oxide), lower alkyl ethers of polyols or poly(alkylene oxides), alcohol amines, and many others. The inert comonomer is any comonomer that will not render the derivatized comonomer ineffective. Examples of other comonomers include, but are not limited to, ethylene, propylene, styrene, and acrylonitrile. One skilled in the art will recognize additional comonomers.

The polymers useful with the method of this invention, and polymers that can be converted into polymers that are useful with the method of this invention, can be prepared by known methods for preparing polymers of maleic anhydride with olefinically unsaturated comonomers. Free radical polymerization is preferred but cationic and anionic polymerization can also be used. It is also preferred that polymerization be conducted in a solvent to improve temperature control, handling of the reaction mass, etc. However, bulk polymerization and dispersion polymerization can also be used in appropriate circumstances. The polymer, or suitable salt thereof, must be water soluble, so polymerization and cross linking should not be allowed to proceed to the point where solubility is insufficient for effective scale inhibition.

The molecular weight of the inhibitor has been found to be important in determining activity. There exists for each polymer a critical minimum molecular weight, below which the polymer is ineffective. If the polymer has a molecular weight that is higher than the critical minimum molecular weight, there is little advantage to increasing molecular weight, further. Most polymers of this invention decrease somewhat in performance as molecular weight is increased beyond an optimum molecular weight range which is usually fairly close to the critical minimum molecular weight. As a result, polymerization must be controlled to produce a polymer of sufficient molecular weight to be above the critical minimum molecular weight. The critical minimum molecular weight and the optimum molecular weight range vary from polymer to polymer, and cannot be predicted, However, they can easily be determined for each polymer by routine experimentation.

Derivatization can also be carried out in the appropriate solvent for the derivatization reaction being run. The choice of solvent depends upon the type of derivatization being done.

The polymers of this invention are effective as threshold scale inhibitors. This means that the inhibitor is effective at inhibiting scale formation at substantially less than a stoichiometric ratio compared with the scale-forming cation. Typically, the mole ratio of precipitating cation to the inhibitor is on the order of 10:1 or 20:1 and is sometimes much greater. Threshold scale inhibition is well known in the water treatment field and is normally the route used to inhibit scale formation, rather than the stoichiometric sequestration of metal ions. The polymers of this invention have been found to be effective threshold scale inhibitors, with respect to calcium and phosphates, most particularly with respect to calcium orthophosphate.

For the polymers of this invention to be considered to be effective, they must exhibit some scale inhibition in a system containing standard concentrations of the scale-forming ions at a concentration below 100 ppm of inhibitor. Standard conditions for measuring orthophosphate scale inhibition are 150 ppm of cation, such as calcium and 20 ppm of orthophosphate at pH 8.5. Standard conditions for measuring carbonate scale inhibition are stoichiometric amounts of a cation, such as calcium, and carbonate, at 1600 ppm of carbonate salt at pH 8.5. Standard conditions for measuring sulfate scale inhibition are stoichiometric amounts of a cation, such as calcium, and sulfate at 10,000 ppm of sulfate salt at pH 7. Preferably the polymer should exhibit at least 20% scale inhibition, and more preferably, at least 50% scale inhibition below 100 ppm. The best calcium phosphate scale inhibitor will exhibit greater than 90% scale inhibition at 30 ppm with the very best approaching 90% scale inhibition below 40 ppm. Although each of the polymers within the scope of this invention has some activity, it is not possible to predict which subclasses of polymers will be the very high performers and which will be more modest performers, but this can be determined by a fairly simple test using standard conditions set forth above.

Of course the amount of inhibitor necessary to most effectively inhibit scale formation depends upon the concentration of scale-forming ions in the system. As a general matter, the polymers of this invention have some effectiveness at inhibiting scale formation as low as 1 ppm, preferably 5 ppm, with use of greater than 10 ppm being more preferred. As a practical matter there is normally no advantage to be gained from using more than 500 ppm of the polymer, and most applications require 200 ppm or less, and many applications require 100 ppm or less. Some very specialized applications, such as desalinization of sea water, can result in extremely high concentrations of dissolved solids which may require a concentration of inhibitor as high as 2000 ppm.

The method of this invention is effective at inhibiting formation of scale generally, particularly scale of multivalent cations, and multivalent anions. These multivalent cations include but are not limited to alkaline earth metals including but not limited to calcium, magnesium, strontium and barium. These multivalent ions include, but are not limited to phosphate, sulfate and carbonate. The method of this invention is particularly effective at inhibiting formation of calcium orthophosphate scale, although it is also effective against calcium salts of other phosphates such as condensed phosphates.

Without being bound by theory, it is believed that the polymer inhibits crystal growth at the very early stages of crystal formation. This can be achieved with maleic anhydride polymers in which the maleic portion of the polymer contains at least one free acid or water soluble salt of a free acid, or remains as an acid anhydride, and in which either the maleic portion of the polymer or the portion from a comonomer contains a functional group selected from the class consisting of —OH of alcohol;

$$-\overset{|}{\underset{}{N}}-$$

of amine, amide, sulfonamide, amine oxide, quaternary ammonium salt, or lactam; —SO of sulfonate, sulfone, sulfonamide, or sulfoxide; —O— of ether or ester; or —S— of sulfide or mercaptan. It is believed that the proximity of the functional group and the acid or anhydride group provides the key to this invention. When the functional group is attached to the other comonomer, the carbon to which the branch containing the functional group is attached is preferably connected to the maleic anhydride monomer during polymerization. It is preferred that the branch containing the functional group, and a branch that contains the free acid or water soluble salt of a free acid or acid anhydride group be attached. If the maleic portion of the polymer contains both the free acid or salt of a free acid and the functional group, both branches will be attached to adjacent carbons in the polymer backbone.

As is described above, one preferred subclass of polymers is copolymers of maleic anhydride with an N-alkyl-N-vinylamide of the following formula:

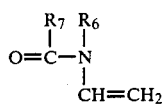

where $R_6$ and $R_7$ are alkyl, and may join together to form a lactam ring. It is preferred that the total number of carbon atoms in $R_6$ and $R_7$ total 20 or less, more preferably 11 or less, and most preferaby 7 or less. Water soluble salts and hydrolysis products of these copolymers are also effective. Examples of the N-vinyl-N-alkylamides, include, but are not limited to N-methyl-N-vinylacetamide and other N-alkyl-N-vinylacetamides, N-vinylpyrrolidone, N-vinylpiperidone, N-vinylcaprolactam, N-vinylaurolactam, and others. The alkyl groups and the amides may be either straight or branched chain and the lactam rings may optionally have side chains. $R_6$ and $R_7$ may also contain groups that do not render the polymer ineffective.

As is described above, a second preferred subclass of polymers is half esters of maleic anhydride polymers with the following repeating structural moiety:

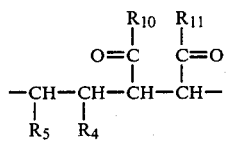

One of $R_{10}$ and $R_{11}$ is either a free acid or a water soluble salt of a free acid and the other is an ester of a polyol, a lower poly(alkylene oxide), a lower alkyl ether of a polyol or poly(alkylene oxide), or an alcohol amine. $R_4$ and $R_5$ are individually either hydrogen or a group that does not render the polymer ineffective.

Examples of polyols that are suitable include, but are not limited to, ethylene glycol, propylene glycol, 1,3-propanediol, and the various butanediols, propanetriols, and butanetriols. To minimize cross linking during esterification, diols are preferred to higher alcohols. A diol with one primary and one secondary alcohol is preferred because the primary alcohol is free to react to form an ester, and the secondary alcohol is sterically hindered to some extent to minimize cross linking. As a result, propylene glycol is the preferred polyol.

Examples of poly(alkylene oxides) include, but are not limited to, diethylene glycol, triethylene glycol and other alcohols of the following formula:

$$H(OC_nH_{2n})_mOH$$

where n is an integer from 2 to 4 m is an integer from 2 to 6.

Examples of lower alkyl ethers of polyols include, but are not limited to ethylene glycol monoethyl ether, ethylene glycol monoethyl ether, 2-methoxy-1-propanol, 2-ethoxyethanol, and similar compounds. It is preferred that the lower alkyl ether group contains a $C_{1-4}$ alkyl substituent.

Examples of a lower alkyl ether of a poly(alkylene oxide) include, but are not limited to diethylene glycol methyl ether, diethylene glycol ethyl ether, triethylene glycol methyl ether, and similar compounds. It is preferred that the lower alkyl ether group contains a $C_{1-4}$ alkyl substitutent.

Examples of alcohol amines include but are not limited to ethanolamine, 2-aminopropanol, 2-methylaminoethanol, and others.

The esterification reaction can be carried out in a conventional manner. Esterification catalysts may be used, but normally are not needed. Esterification catalysts may in some instances be detrimental by promoting cross linking.

After esterification, the product can be used directly, if it is sufficiently water soluble, however water solubility can be increased by partial or complete neutralization of the free acid group, with an appropriate base, such as sodium, potassium or ammonium hydroxide, or other bases to form a water soluble salt.

The other monomer used to produce the initial maleic anhydride polymer can be any monomer that does not render the polymer ineffective. Because of its simplicity, ethylene is the preferred comonomer, however propylene, styrene, acrylonitrile, vinyl ether, vinyl ester, and vinyl halides are all appropriate comonomers. However, preparation of effective half esters of styrene/maleic anhydride copolymers have proven difficult, presumably because the steric effect of the bulky phenyl group inhibits esterification.

Without intending to be limiting, the following monomers can be used to produce polymers with these functional groups in the $R_1$ position: —OH of alcohol from alkyl alcohol or from hydroxyalkyl esters of acrylic acid or methacrylic acid, care must be taken in preparation of these polymers because the —OH group can react with the maleic anhydride to form a partial ester in addition to olefinic polymerization to create a polymer with a mixed olefinic-polyester backbone or a cross linked structure;

of amine from vinyl amine or from an aminoalkyl ester of acrylic acid or methacrylic acid;

of amide from N-vinyl amides;

of sulfonamide from a vinyl sulfonic acid dialkyl amide;

of lactam from N-vinyllactam;

of amine oxide from unsaturated amine oxides;

of a quaternary ammonium salt from an unsaturated quaternary ammonium salt; —O— of ether from alkylvinyl ethers or from alkyl ethers of hydroxyalkyl esters of acrylic or methacrylic acid or from poly(alkylene oxide) esters of acrylic or methacrylic acid; —O— of ester from a vinyl ester or from ethylene glycol monoacetate; —SO of sulfonate from a vinyl alkyl sulfonate or from an ester formed from a sulfonated alcohol and acrylic or methacrylic acid; —SO of sulfone from a vinyl alkyl sulfone; —SO of sulfonamide from a vinylsulfonic acid dialkyl amide; —SO of sulfoxide from vinyl alkyl sulfoxide; —S— of sulfide from vinyl alkyl sulfide; ; and —S— of mercaptan from allyl mercaptan.

Without intending to be limiting, the following procedures can be used to produce polymers with these functional groups in the $R_2$ or $R_3$ position: —OH of alcohol by forming a half ester of the maleic portion of the copolymer with a polyol or with a poly(alkylene oxide);

of amine by forming the half ester with an amine alcohol;

of amide by reacting the maleic portion of the copolymer with an amine such as dimethylamine, to form an amide or by forming a half ester with a hydroxyamide such as N-β-hydroxyethyl acetamide;

of sulfonamide by reacting the polymer with a hydroxyalkyl sulfonate or with an aminoalkyl sulfonate;

of lactam by forming a half ester with an alcohol substituted lactam such as N-β-hydroxyethyl pyrrolidone;

of amine oxide by forming a half ester with a hydroxyalkyl or hydroxyaryl amine oxide;

of a quaternary ammonium salt by forming a half ester with a hydroxyalkyl or hydroxyaryl quaternary ammonium salt; —SO of sulfonate by forming a half ester with a hydroxyalkyl sulfonate or a sulfonated polyol or by reacting the maleic portion of the polymer with an aminoalkyl sulfonate; —SO of sulfone by forming a half ester with hydroxyalkyl sulfone or by reacting the maleic portion of the polymer with an aminoalkyl sulfone; —SO of sulfonamide as above; —SO of sulfoxide by forming a half ester with a hydroxyalkyl sulfoxide or by reacting the maleic portion of the polymer with an aminoalkyl sulfoxide; —O— of ether by forming a half ester with an alkyl ether of polyol or of a poly(alkylene oxide); —O— of ester by forming a half ester with a hydroxyalkyl ester, such as ethylene glycol monoacetate; —S— of sulfide by reacting the maleic portion of the polymer with a hydroxyalkyl sulfide or an aminoalkyl sulfide; and —S— of mercaptan by forming the half ester of a mercaptoalcohol.

In addition to the above, one skilled in the art will recognize many other ways to achieve the desired placement of the appropriate functional groups. Also, one can combine these techniques or use other techniques to produce a copolymer with functional groups both on $R_1$ and on either $R_2$ or $R_3$, which is also within the scope of the invention. The polymer can contain, in addition to the repeating structural moiety described above, additional groups along the polymer chain. These additional groups can either be inert, or can impart the copolymer with useful properties, such as solubility, handling and processing ease, etc. Additionally, derivatives of polymaleic anhydride are included within the scope of this invention where one of $R_4$ is a free acid or salt of a free acid and $R_1$ is a derivative of an acid containing an appropriate functional group.

The following Examples illustrate this invention, and are not intended to in any way limit its scope. Unless indicated otherwise, as used herein, all percentages and parts are by weight and all temperatures are centigrade.

In each of the Examples, calcium phosphate scale inhibition was determined. A solution was prepared containing 150 ppm of calcium ions and 20 ppm of orthophosphate ions. The indicated dose of inhibitor was added as the sodium salt and the pH was adjusted to 8.5. The samples were placed in a shaker bath at about 65° C. After 24 hours, the amount of phosphate remaining in solution was determined spectrophotometrically for each sample, as well as for a control in which no inhibitor was present. Calcium orthophosphate scale inhibition was calculated according to the following formula:

$$\% \text{ Inhib} = \frac{\text{ppm PO}_4 \text{ (sample)} - \text{ppm PO}_4 \text{ (control)}}{\text{ppm PO}_4 \text{ (initial)} - \text{ppm PO}_4 \text{ (control)}} \times 100$$

EXAMPLE I

Copoly(N-methyl-N-vinylacetamide/maleic anhydride) was prepared as follows. About 5 g of maleic anhydride free of maleic acid was dissolved in about 32 g of tetrahydrofuran. This solution was placed in a flask fitted with a dropping funnel, mechanical stirrer and nitrogen inlet. The dropping funnel was charged with about 4 g of N-methylvinylacetamide dissolved in about 13 g of tetrahydrofuran and 0.25 ml of 90% t-butyl hydroperoxide. The temperature of the reaction was adjusted to about 30° C., and the N-methyl-N-vinylacetamide solution was added dropwise over a period of about 4 hours. About 0.5 ml of a 1 Molar solution of triethylborane in hexane was added to the reaction flask at the beginning of the reaction run, and every hour thereafter. At the end of about 7 hours reaction time, the product polymer was precipitated by addition of about 50 ml of petroleum ether. Ths slurry was filtered and washed with diethylether and dried.

Inhibition of calcium orthophosphate scale was determined as described above, and the results of the scale inhibition tests are shown in Table I.

TABLE 1

| Conc. (ppm) | 10 | 20 | 30 | 40 | 50 | 75 | 100 |
|---|---|---|---|---|---|---|---|
| % Inhib | 7.8 | 12.5 | 85.4 | 99.4 | 97.5 | 97 | 98.3 |

EXAMPLE II

Copoly(N-vinyl-2-pyrrolidone/maleic anhydride was prepared as follows. About 7.8 g of maleic anhydride was added to about 85 ml of dioxane in a flask equipped with a reflux condenser, mechanical stirrer, and nitrogen inlet. The flask and its contents were heated to about 80° C. About 7.06 g of N-vinyl-2-pyrrolidone and about 0.96 g azobisisobutyronitrile were dissolved in about 50 ml of dioxane. About 15 ml aliquots of the N-vinyl-2-pyrrolidone solution were added to the contents of the flask at 15 minute intervals, while maintaining the temperature of the flask at about 80° C. After addition was complete, the flask was held at about 80° C. to provide for a total reaction time of 3 hours. The reaction mixture was cooled to room temperature, poured into about 250 ml of petroleum ether, to precipitate the polymer, and filtered. The solid product was dried, and inhibition of calcium orthophosphate scale was determined as described above. The results are reported in Table 2.

TABLE 2

| Conc. (ppm) | 10 | 20 | 30 | 40 | 50 | 75 | 100 |
|---|---|---|---|---|---|---|---|
| % Inhib. | 10.0 | 8.9 | 26.4 | 45.0 | 65.3 | 92.5 | 93.9 |

EXAMPLE III

Copoly(N-vinyl-2-piperidone/maleic anhydride) was prepared according to the following procedure. About 5 g of maleic anhydride was dissolved in about 80 ml of ethylbenzene and filtered. The filtrate was added to a 3 neck flask fitted with a dropping funnel, mechanical stirrer, and nitrogen inlet. The dropping funnel was charged with about 5.1 g of N-vinyl-2-piperidone in about 40 ml of ethylbenzene and about 0.42 ml of 78% cumene hydroperoxide. The temperature was adjusted to about 30° C., and about 0.5 ml of 1 molar triethylborane in hexane was added to the reaction mixture at the beginning of the run and every hour thereafter. The N-vinyl-2-piperidone solution was added to the reaction mixture dropwise for about 4 hours, and the reaction mixture was stirred and maintained at about 30° for an additional 2 hours. The reaction mixture was cooled to room temperature, and was filtered to remove the solid polymeric product, which was then rinsed with ethylbenzene and 50 ml of petroleum ether and dried.

Inhibition of calcium orthophosphate scale for the copoly(N-vinyl-2-piperidone/maleic anhydride) produced above was determined as described above. The results are shown in Table 3.

TABLE 3

| Conc. (ppm) | 10 | 20 | 30 | 40 | 50 | 75 | 100 |
|---|---|---|---|---|---|---|---|
| % Inhib | 14.4 | 17.7 | 43.7 | 84.3 | 96.4 | 99.7 | 98.1 |

EXAMPLE IV

Copoly(N-vinyl-ε-caprolactam/maleic anhydride) was prepared according to the following procedure. About 3 g of maleic anhydride was dissolved in about 48 ml of ethylbenzene and filtered. The filtrate was added to a 3 neck flask fitted with a mechanical stirrer, and a nitrogen inlet. About 3.52 g of N-vinyl-ε-caprolactam were dissolved in about 23.2 g of ethylbenzene and 0.49 ml of 78% cumene hydroperoxide. The temperature of the reaction mixture was adjusted to about 33° C. and about 0.45 ml of 1 molar triethylborane in hexane was added at the beginning of the reaction run and every hour thereafter, and 3 ml aliquots of the N-vinyl-ε-caprolactam solution were added at the beginning of the run and every 30 minutes thereafter. Addition was complete after about 4½ hours, and the reaction mixture was stirred and maintained at about 33° C. for an additional 3½ hours. The reaction mixture was cooled and filtered to recover the solid polymeric product which was rinsed with petroleum ether and dried.

Inhibition of calcium orthophosphate scale of the copoly(N-vinyl-ε-caprolactam/maleic anhydride) product produced above was determined as described above. The results are set forth in Table 4.

TABLE 4

| Conc. (ppm) | 10 | 20 | 30 | 40 | 50 | 75 | 100 |
|---|---|---|---|---|---|---|---|
| % Inhib | 8.8 | 20.8 | 52.8 | 93.7 | 100 | 95 | 95.6 |

EXAMPLE V

A quarterpolymer of N-vinyl-2-pyrrolidone, N-vinyl-2-piperidone, N-vinyl-ε-caprolactam, and maleic anhydride was prepared according to the following procedure. About 10.7 g of maleic anhydride was dissolved in about 170 ml of ethylbenzene and filtered. The filtrate was added to a 3 neck flask fitted with a mechanical stirrer and a nitrogen inlet. About 1.71 g of N-vinyl-ε-caprolactam, about 7.01 g of N-vinyl-2-piperidone, and about 2.05 g of N-vinyl-2-pyrrolidone were dissolved in about 98 ml of ethylbenzene along with about 1.75 ml of 78% cumene hydroperoxide. The temperature of the reaction mixture was raised to about 33° C. and maintained there. About 1.6 ml of 1 molar triethylborane in hexane was added at the beginning of the reaction and every hour thereafter, and 10 ml aliquots of the N-vinyl-lactam solution were added at the beginning of the reaction and every 30 minutes thereafter. Addition was complete after 4 hours and the reaction mixture was stirred and maintained at about 33° C. for an additional 2 hours. The reaction mixture was cooled and filtered to recover the solid polymeric product which was rinsed with petroleum ether and dried.

Inhibition of calcium orthophosphate was determined as above. The results are reported in Table 5.

TABLE 5

| Conc. (ppm) | 10 | 20 | 30 | 40 | 50 | 75 | 100 |
|---|---|---|---|---|---|---|---|

TABLE 5-continued

| % Inhib. | 9.7 | 16.6 | 41.5 | 90.4 | 92.8 | 94.8 | 94.8 |
|---|---|---|---|---|---|---|---|

EXAMPLE VI

This Example demonstrates that hydrolysis has little or no detrimental effect upon maleic anhydride/N-vinyllactams. About one gram of copoly(N-vinyl-2-pyrrolidone/maleic anhydride) was refluxed with a mixture of 24 g of water and 75 g of concentrated HCl, to effect acidic hydrolysis. Aliquots were withdrawn at the indicated time and inhibition of calcium orthophosphate scale was determined as described above for each aliquot, using about 50 ppm of the polymer. A similar series of scale inhibition tests were run at pH 7.5. The results are reported in Table 6.

TABLE 6

| Time (hours) | % inhib pH 7.5 | % inhib pH 8.5 |
|---|---|---|
| 0 | 88.3 | 20.8 |
| 0.2 | 87.5 | 25.6 |
| 0.5 | — | 26.1 |
| 1.0 | — | 27.2 |
| 1.5 | — | 28.2 |
| 2.5 | 84.7 | 24.5 |
| 3.5 | 87.1 | 14.4 |
| 4.5 | 88.3 | 12.0 |
| 5.5 | 85.5 | 14.1 |
| 6.5 | 88.3 | 13.9 |
| 12 | 92.3 | 14.4 |
| 24 | 96.8 | — |

The copoly(N-vinyl-2-pyrrolidone) used above was higher molecular weight than optimum, as can be seen from the comparatively low % inhibition values. At pH 7.5, hydrolysis had virtually no effect on scale inhibition. At pH 8.5, there was some effect, but it was comparatively small.

EXAMPLE VII

Low molecular weight (weight average molecular weight of about 1900) copolymer of ethylene and maleic anhydride was modified by heating with ethylene glycol at 100° C. for 1.5 hours, to form an ethylene glycol half ester of the maleic anhydride group. Calcium orthophosphate scale inhibition was determined, as above, to be 33% at 50 ppm and 87.9% at 100 ppm.

EXAMPLE VIII

Example VII was repeated, except that it was heated at 88° C. for 1.2 hours. Calcium orthophosphate scale inhibition at 50 ppm was only 9.1%, but at 100 ppm inhibition was 93.5%. This indicates that the profile of activity with respect to concentration was quite different than the product of Example VII, but that it achieves a high enough level of activity so that this product is considered to be quite effective.

EXAMPLE IX

Low molecular weight ethylene/maleic anhydride copolymer was heated at 89° C. for 1 hour with diethylene glycol to form a diethylene glycol half ester of the maleic anhydride group. The calcium orthophosphate scale inhibition was found to be 93.7% at 50 ppm and 95.6% at 100 ppm.

EXAMPLE X

Low molecular weight ethylene/maleic anhydride copolymer was heated with diethylene glycol monoethyl ether to form a diethylene glycol ethyl ether half ester of the maleic anhydride group. Calcium orthophosphate scale inhibition was determined to be 85.2% at 50 ppm and 91.0% at 100 ppm.

EXAMPLE XI

Low molecular weight ethylene/maleic anhydride copolymer was heated with triethylene glycol at 100° C. for 1.5 hours to form the triethylene glycol half ester of the maleic anhydride group. Calcium orthophosphate scale inhibition was determined to be 87.9% at 50 ppm and 92.9% at 100 ppm.

EXAMPLE XII

Low molecular weight ethylene/maleic anhydride copolymer was reacted with ethanolamine to form the ethanolamine half ester of the maleic anhydride group. Calcium orthophosphate scale inhibition was determined to be 31.1% at 50 ppm and 79.4% at 100 ppm.

EXAMPLE XIII

Low molecular weight ethylene/maleic anhydride copolymer was heated with propylene glycol at 85° C. for 1.5 hours, then neutralized with NaOH. Calcium orthophosphate scale inhibition was determined as above and the results are reported in Table 13, below.

TABLE 13

| Conc. (ppm) | 10 | 20 | 30 | 40 | 50 | 75 | 100 |
|---|---|---|---|---|---|---|---|
| % Inhib. | 5 | 11.4 | 23.4 | 44.7 | 94.7 | 95 | 100 |

EXAMPLE XIV

Low molecular weight ethylene/maleic anhydride copolymer was heated with diethylene glycol monomethyl ether at 90° C. for 4 hours, to form a diethylene glycol monomethyl ether half ester of the maleic anhydride group. Calcium orthophosphate scale inhibition was determined, as above, and the results are shown in Table 14.

TABLE 14

| Conc. (ppm) | 10 | 20 | 30 | 40 | 50 |
|---|---|---|---|---|---|
| % Inhib. | 3.5 | 62 | 91 | 100 | 100 |

EXAMPLE XV

Low molecular weight ethylene/maleic anhydride copolymer was refluxed with methanol for 24 hours to form a methyl half ester of the maleic anhydride group. Calcium orthophosphate scale inhibition was determined as above and the results are reported in Table 15.

TABLE 15

| Conc. (ppm) | 20 | 30 | 40 | 50 | 100 |
|---|---|---|---|---|---|
| % Inhib. | 1.4 | 11.7 | 48.9 | 100 | 100 |

In general, activity of half esters of monohydroxyalcohols decreases with molecular weight of the alcohol, so that a half ester of ethanol would be expected to be less active than the half ester of methanol, etc.

EXAMPLE XVI

Calcium carbonate scale inhibition was determined according to the following procedure:

A solution was made up with 645 ppm of calcium, 280 ppm of sodium carbonate, and 1110 ppm of sodium bicarbonate, which results in a solution with approximately stoichiometric amounts of calcium and carbonate in sufficient quantity to be expressed as 1600 ppm of calcium carbonate. The pH was adjusted to 8.6. The indicated amount of inhibitor was added as the sodium salt and the solutions were swirled for 24 hours at 25° C. The solutions were then filtered and the amount of calcium remaining in solution was determined by titrating with EDTA. The % scale inhibition was calculated as follows:

$$\% \text{ Inhib} = \frac{\text{ppm CaCO}_3 \text{ (sample)} - \text{ppm CaCO}_3 \text{ (control)}}{\text{ppm CaCO}_3 \text{ (initial)} - \text{ppm CaCO}_3 \text{ (control)}} \times 100$$

The results are shown in Table 16.

TABLE 16

| | ppm Inhibitor | | | | |
|---|---|---|---|---|---|
| | 10 | 25 | 50 | 100 | 150 |
| Copoly(N—methyl-N—vinylacetamide/maleic anhydride) | 28.3% | 39.1% | 41.3% | 47.8% | 50% |
| Copoly N—vinyl-2-pyrrolidone maleic anhydride | 43.5% | 54.4% | 93.5% | 100% | 100% |
| Copoly(methyl vinyl ether/maleic anhydride) | 23.9% | 32.6% | 52.2% | 54.4% | 69.6% |

We claim:

1. A method for inhibiting the precipitation of calcium phosphate in an aqueous medium having a pH of at least 8.5, comprising adding to said aqueous medium an effective amount of a water soluble maleate polymer consisting essentially of the following repeating structural moiety:

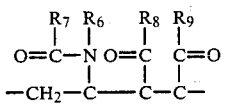

(a) where $R_6$ and $R_7$ are the same or different and are alkyl groups or $R_6$ and $R_7$ may join together to form a lactam ring, and (b) where $R_8$ and $R_9$ are individually a free acid or water soluble salt of a free acid or $R_8$ and $R_9$ together may be an oxygen to form an acid anhydride.

2. The method of claim 1 wherein said effective amount is from 1 ppm to 2000 ppm.

3. The method of claim 1 wherein said effective amount is from 5 ppm to 500 ppm.

4. The method of claim 1 wherein the total number of carbon atoms of $R_6$ and $R_7$ is 20 or less.

5. The method of claim 1 wherein the total number of carbon atoms of $R_6$ and $R_7$ is 11 or less.

6. The method of claim 1 wherein $R_6$ and $R_7$ join to form a lactam ring and total 4 to 6 carbon atoms.

7. The method of claim 1 wherein said water soluble maleate polymer is a water soluble salt of copoly(N-vinyl-N-alkylacetamide/maleic anhydride).

8. The method of claim 1 wherein said water soluble maleate polymer is a water soluble salt of copoly(N-vinylpyrrolidone/maleic anhydride).

9. The method of claim 1 wherein said water soluble maleate polymer is a water soluble salt of copoly(N-vinylpiperidone/maleic anhydride).

10. The method of claim 1 wherein said water soluble maleate polymer is a water soluble salt of copoly(N-vinylcaprolactam/maleic anhydride).

11. The method of claim 1 wherein said water soluble maleate polymer is a water soluble salt of copoly(N-vinyllaurolactam/maleic anhydride).

12. A method for inhibiting the precipitation of calcium phosphate in an aqueous medium having a pH of at least 8.5, comprising adding to said aqueous medium from 5 ppm to 500 ppm of a water soluble maleate polymer that consists essentially of the following repeating structural moiety:

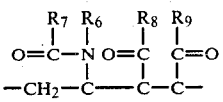

(a) where $R_6$ and $R_7$ are the same or different and are alkyl groups or $R_6$ and $R_7$ may join together to form a lactam ring, with the total number of carbons in $R_6$ and $R_7$ being 11 or less and (b) where $R_8$ and $R_9$ are individually a free acid or water soluble salt of a free acid.

13. A method of inhibiting the precipitation of calcium phosphate in an aqueous medium having a pH of at least 8.5, comprising adding to said aqueous medium an effective amount of a water soluble maleate polymer that consists essentially of the following repeating structural moiety:

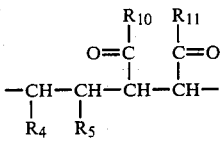

(a) where one of $R_{10}$ and $R_{11}$ is either a free acid or a water soluble salt of a free acid, and the other of $R_{10}$ and $R_{11}$ is an ester of an alcohol selected from the class consisting of a polyol, a lower poly(alkylene oxide), a lower alkyl ether of a polyol or a poly(alkylene oxide), and an alcohol amine; and (b) where $R_4$ and $R_5$ are individually either H or a group that does not render the polymer ineffective.

14. The method of claim 13 wherein said effective amount is from 1 ppm to 2000 ppm.

15. The method of claim 13 wherein said effective amount is from 5 ppm to 500 ppm.

16. The method of claim 13 wherein said water soluble maleate polymer is a water soluble salt of a half ester of copoly(ethylene/maleic anhydride) with an alcohol selected from the class consisting of methanol, ethylene glycol, propylene glycol, diethylene glycol, triethylene glycol, diethylene glycol monomethyl ether, diethylene glycol monoethyl ether, and ethanolamine.

17. A method for inhibiting the precipitation of calcium phosphate in an aqueous medium having a pH of at least 8.5, comprising adding to said aqueous medium from 5 ppm to 500 ppm of a water soluble maleate polymer consisting essentially of the following repeating structural moiety:

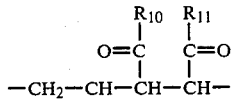

where one of $R_{10}$ and $R_{11}$ is either a free acid or water soluble salt of a free acid and the other of $R_{10}$ and $R_{11}$ is an ester of an alcohol selected from the class consisting of a polyol; a lower poly(alkylene oxide); a lower alkyl ether of a polyol or a poly(alkylene oxide); an alcohol amine; and methanol.

* * * * *

UNITED STATES PATENT AND TRADEMARK OFFICE
CERTIFICATE OF CORRECTION

PATENT NO. : 4,673,508
DATED : June 16, 1987
INVENTOR(S) : J. P. Coleman et al

It is certified that error appears in the above-identified patent and that said Letters Patent are hereby corrected as shown below:

Column 2, line 68, insert after "effective" --at high pH's that are currently used, and particularly those that are effective--.

Column 3, line 53, delete "--$CH_2$-C-C-C-" and insert therefor --$CH_2$-CH-CH-CH--.

Column 7, line 63 insert after "4" --and--.

Column 7, line 66, delete "monoethyl" and insert therefor --monomethyl--.

Column 15, line 40, delete "-$CH_2$-C-C-C" and insert therefor --$CH_2$-CH-CH-CH--.

Column 16, line 14, delete "-$CH_2$-C-C-C" and insert therefor --$CH_2$-CH-CH-CH--.

Signed and Sealed this

Fifteenth Day of December, 1987

Attest:

DONALD J. QUIGG

Attesting Officer     Commissioner of Patents and Trademarks